3,142,554
CONTROLLING VEGETATION WITH ARYL
THIOALKYLAMINES
Kenneth L. Godfrey, Kirkwood, Mo., assignor to
Monsanto Company, a corporation of Delaware
No Drawing. Filed Oct. 10, 1961, Ser. No. 144,030
20 Claims. (Cl. 71—2.3)

The present invention relates to methods of destroying or controlling vegetation and to herbicidal compositions. More particularly it relates to methods of destroying or controlling vegetation by applying thereto a toxic concentration of a tertiary amine containing an arylmercapto substituted alkyl radical.

The widespread use of chlorophenoxy acetic acids for chemical weed control has revealed serious deficiencies. There are weeds of economic importance which are resistant to the chlorophenoxy acetic acids. The removal of susceptible weeds increases the opportunity for resistant species to flourish. Accordingly, there has arisen a need for agents to control such hard to kill weeds as morning glory, field bindweed, Canadian thistle and devil's club. Furthermore, the chlorophenoxy acetic acids are unsafe to use on some crops because they injure or destroy the crop as well as the weeds. For example, cotton is fantastically sensitive to 2,4-D and cotton is a major crop. There is need for means to control weeds growing in cotton and corn.

A general object of the invention is to destroy undesired vegetation. A particular object of the invention is to destroy weeds resistant to the chlorophenoxy acetic acids. A further general object is to provide improved compositions for agricultural use. A further particular object is to provide agricultural compositions which, in very low concentrations, destroy many broadleaf and some narrow-leaf weeds without injuring desired grasses. Other and further objects will either be apparent or pointed out in the detailed description of the invention which follows.

The active agents employed in the process of this invention may be represented by the general formula

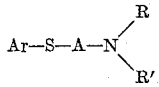

where Ar represents an aryl radical, A represents alkylene of less than five carbon atoms and R and R' represent lower alkyl, lower alkoxy substituted lower alkyl, lower alkenyl or one of R and R' represents hydrogen, phenyl, benzyl, propynyl, halogen substituted alkenyl, as for example 2-chloroallyl, 2-bromoallyl, or cyclohexyl or R and R' together with N constitue a heterocyclic radical. The aryl radical designated Ar is preferably a member of the benzene series, as for example phenyl, p-tolyl, p-ethylphenyl, p-isopropylphenyl, xylyl, p-nitrophenyl, p-nonylphenyl, p-decylphenyl, p-halophenyl which halogen is preferably a middle halogen, i.e. either chlorine or bromine but may be fluorine or iodine, o-benzyl p-chlorophenyl, pentachlorophenyl, lower alkoxy substituted phenyl of which p-methoxy, p-ethoxy, p-propoxy and p-isopropoxy substituted phenyl are representative. Herbicidal activity is also supported by 3,4-dichlorophenyl with the proviso that A contains no more than two carbon atoms. The alkylene preferably separates nitrogen and sulfur by one or two carbon atoms and in any event it is desirable that it contain not more than four carbon atoms. The substituents designated R and R' are illustrated by methyl, ethyl, propyl, ethoxymethyl, ethoxyethyl, propoxyethyl, propoxymethyl, allyl, methalyl, isopropyl, butyl, or together with the nitrogen constitute morpholinyl, piperidinyl or pyrolodinyl.

In general, practice of this invention involves selectively destroying broadleaf plants through contact of the foliage with a lethal concentration of the toxicant without significant injury to grasses. On the other hand, it was further discovered that severe general phytotoxicity was achieved where, in the general formula, Ar was p-chlorophenyl, A was ethylene and R and R' were ethyl. The herbicidal effect is usually accompanied by chlorosis and occasionally by defoliation. Tillering and other formative effects are often observed. By selecting as the toxicant compounds in which Ar is unsubstituted phenyl, monochlorophenyl or dichlorophenyl and A is an alkylene group separating the nitrogen and sulfur by two carbon atoms, weeds and other obnoxious vegetation are controlled by preemergent application as well as by foliage contact application. Moreover, the application of these compounds destroys nematodes and other organisms present in and on the treated plant or in the soil adjacent thereto. The toxicants may be applied conveniently in the form of a spray containing the active ingredient in a concentration within the range of 0.05 to 10.0% by weight. Thorough coverage of the foliage is effective for contact killing. For pre-emergence control of plants amounts within the range of 3 to 50 pounds per acre may be used. By applying the toxicant to the plant is meant any means whereby it is brought into contact with living plants, as for example by application to the ground before the plants emerge or by direct application to the foliage.

The new toxicants are soluble in common organic solvents. Water solubility can be increased by converting the free bases to acid addition salts or to quaternary ammonium salts and such salts used for control of vegetation if desired. The phytotoxic properties are in general quite similar. Examples comprise 2-(p-chlorophenylthio)triethylamine phosphate, 2-(p-chlorophenylthio)triethylamine hydrochloride, 2 - (p - chlorophenylthio)triethylamine sulfate, 2-(p-chlorophenylthio)triethylamine acetate, 2-(p-chlorophenylthio)triethylammonium bromide and 2-(p-chlorophenylthio)triethylammonium iodide. Where the properties of phytotoxic organic acids can be tolerated these may constitute the acid elements. The salts of 2,4-di-, 2,5-di- and 2,4,5-trichlorophenoxy acetic acid and of 2,2-dichloropropionic acid are all strongly phytotoxic.

The toxicants may be dispersed directly in water or a solution in an organic solvent emulsified in aqueous medium by the aid of a dispersing agent. As dispersing and wetting agents there may be employed soft or hard sodium or potassium soaps, alkylated aromatic sodium sulfonates such as sodium dodocylbenzene sulfonate, an amine salt, as for example dibutylammonium dodecylbenzene sulfonate, alkali metal salts of sulfated fatty alcohols, ethylene oxide condensation products of any of the following: alkyl phenols, tall oil and higher mercaptans. These are illustrative only of a large class of materials available and it will be appreciated that other dispersing and wetting agents may be used. Formulation of dry compositions is accomplished by mixing with finely divided or granular solid carriers. Suitable carriers comprise talc, clay, pyrophyllite, silica and fuller's earth. Usually the toxicant will be only a minor proportion. The dry formulation may be applied directly or dispersed in aqueous medium before application. If the latter, it is advantageous to incorporate a wetting or dispersing aid into the formulation.

The following are illustrative examples of the new toxicants:

2-(2,4,5-trichlorophenylthio)-N,N-dimethylethylamine
2-(2,4-dichlorophenylthio)triethylamine
2-(2,4,6-trichlorophenylthio)triethylamine
2-(p-dodecylphenylthio)triethylamine
2-(p-nonylphenylthio)triethylamine
2-(p-nitrophenylthio)triethylamine
4-[2-(2-benzyl-4-chlorophenylthio)ethyl]morpholine
2-(2-benzyl-4-chlorophenylthio)triethylamine
2-(p-chlorophenylthio)-N,N-diallylethylamine
2-(p-chlorophenylthio)-N-phenyldiethylamine
2-(p-chlorophenylthio)-N-(2-chloroallyl)diethylamine
2-(p-chlorophenylthio)-N-cyclohexyldiethylamine
2-(p-chlorophenylthio)-N,N-di(2-methoxyethyl)-ethylamine
2-(p-chlorophenylthio)-N-propynyldiethylamine
2-(p-chlorophenylthio)-N-(3-methoxypropyl)-N-(2-chloroallyl)ethylamine
2-(p-tolylthio)triethylamine
2-(p-tolylthio)-N,N-dimethylethylamine
2-(phenylthio)triethylamine
3-(p-chlorophenylthio)-N,N-diethylpropylamine
2-(p-chlorophenylthio)-N,N-dimethylethylamine
2-(p-methoxyphenylthio)triethylamine
2-(pentachlorophenylthio)triethylamine.

A spray containing a concentration of 0.5% of the active ingredient shown in Table I was applied to the foliage of bean plants, to the foliage of a mixture of grasses and finally to the foliage of a mixture of broad-leaved plants. The mixture is indicated in the table as "Broadleaf." A rating of 0 indicates no phytotoxicity, 1 slight, 2 moderate, 3 severe phytotoxicity and 4 plants dead.

*Table I*

| Active Ingredient | Phytotoxicity Rating | | |
|---|---|---|---|
| | Bean | Grass | Broad-leaf |
| 2-(Pentachlorophenylthio)-N,N-dimethylethylamine | 2 | 0 | 2 |
| 2-(Phenylthio)triethylamine | 3 | 1 | 2 |
| 2-(Phenylthio)-N,N-dimethylpropylamine | 3 | 0 | 2 |
| 3-(p-Chlorophenylthio)-N,N-dimethylpropylamine | 3 | 1 | 3 |
| 2-(p-Chlorophenylthio)-N,N-dimethylpropylamine | a3 | 2 | 3 |
| 2-(3,4-Dichlorophenylthio)triethylamine | 3 | 1 | 3 |
| 2-(p-Chlorophenylthio)-N,N-dimethylethylamine | b3 | 1 | 3 |
| 2-(p-Methoxyphenylthio)-N,N-dimethylethylamine | 3 | 1 | 3 |
| 2-(p-Chlorophenylthio)triethylamine | 3 | 4 | 3 |
| 2-(p-Methoxyphenylthio)triethylamine | 3 | 0 | 3 |
| 2-(Pentachlorophenylthio)triethylamine | 3 | 2 | 4 |
| 2-(ar-Tolylthio)triethylamine | 2 | 3 | 3 |
| 2-(ar-Tolylthio)-N,N-dimethylethylamine | 2 | 3 | 2 |
| 2-(p-Chlorophenylthio)-N,N-diethylmethylamine | 2 | 3 | 4 |
| 2-(p-Chlorophenylthio)-N,N-dibutylmethylamine | 2 | 1 | 4 |
| 2-(Phenylthio)-N,N-dibutylmethylamine | 1 | 2 | 2 |
| 2-(ar,ar-Xylyl)triethylamine | 1 | 3 | 2 |
| 2-(p-Nonylphenylthio)triethylamine | | 3 | 4 |
| 2-(p-Nonylphenylthio)-N,N-dimethylethylamine | | 0 | 2 |
| 2-(p-Nonylphenylthio)-N,N-diethylpropylamine | | 1 | 3 | a 76–100% defoliation.
b 51–75% defoliation.

These data show that the compounds are outstanding contact herbicides for broadleaf plants. It was further noted that 2-(p-chlorophenylthio)triethylamine was an effective contact herbicide for broadleaves at concentrations down to 0.05% which corresponds to a rate of only one pound per acre. It induced rapid and complete chlorosis of most plants sprayed with it and eventually death. It produced chlorosis and defoliation of bean leaves at solution concentrations of 0.01%.

The data recorded in Table II demonstrate pre-emergence activity. The toxicant was applied at the rate of 25 pounds per acre and the phytotoxicity observed. It was further found that 2-(p-chlorophenylthio)-N,N-dimethylpropylamine and 2-(p-chlorophenylthio)-N,N-dimethylethylamine retained activity at 5 pounds per acre.

*Table II*

| Active Ingredient | Results Observed |
|---|---|
| 2-(p-Chlorophenylthio)-N,N-dimethylpropylamine. | Severe phytotoxicity to rye grass, mustard (radish), beet-sugar, foxtail, barnyard grass, crab grass and pigweed; moderate phytotoxicity to wild oats. |
| 2-(p-Chlorophenylthio)-N,N-dimethylethylamine. | Severe phytotoxicity to barnyard grass, crab grass and pigweed; moderate phytotoxicity to mustard (radish) and beet-sugar. |
| 2-(3,4-Dichlorophenylthio)-triethylamine. | Severe phytotoxicity to crab grass and pigweed; moderate phytotoxicity to rye grass. |
| 2-(Phenylthio)-N,N-dimethylpropylamine. | Severe phytotoxicity to pigweed; moderate phytotoxicity to crab grass. |
| 2-(Phenylthio)-N,N-dibutylmethylamine. | Severe phytotoxicity to beet-sugar, crab grass, pigweed and buckwheat; moderate phytotoxicity to rye grass and barnyard grass. |

The toxicants may be prepared by standard techniques of which the following are illustrative.

A phenate solution was prepared comprising 0.1 mole of p-chlorothiophenol, 0.1 mole of sodium hydroxide, 100 ml. of n-butanol and 50 ml. of benzene. This solution was heated in a standard Dean-Stark setup and the water formed was removed azeotropically. An amine salt solution was then prepared by dissolving 0.1 mole of diethylaminoethyl chloride hydrochloride in 100 ml. of water and treating with an excess of saturated sodium carbonate solution. The resulting amine salt was extracted with two 100 ml. portions of ethyl ether, separated and the ether solution added slowly to the phenate solution, allowing the ether to distill. The combined solutions were heated one hour at 100–120° C., cooled and washed with water. The 2-(p-chlorophenylthio)triethylamine which separated was dried over sodium carbonate. It was a yellow liquid, B.P. 185–190° C., soluble in all common solvents but insoluble in water.

In another procedure 0.1 mole of dimethylaminoethyl chloride hydrochloride was added in one portion to a stirred solution comprising 0.1 mole of pentachlorobenzenethiol, 0.2 mole of 25% sodium hydroxide and 500 ml. of water. The reaction mixture was heated at 90–100° C. for 6 hours, cooled to 10° C. and extracted with 300 ml. of ethyl ether. The ether solution was washed with water until neutral to litmus, dried over sodium sulfate and the ether removed in vacuo. The 2-(pentachlorophenylthio)-N,N-dimethylethylamine was obtained as a tan solid in 82.1% theory yield. After recrystallization from ethyl alcohol it melted at 77–79° C. Analysis gave 3.87% nitrogen, 8.99% sulfur and 49.21% chlorine as compared to 3.96% nitrogen, 9.07% sulfur and 50.17% chlorine calculated for $C_{10}H_{10}Cl_5NS$.

As further illustrative of the preparation of the compounds, 17.4 grams (0.1 mole) of diethylaminoethyl chloride hydrochloride was added in one portion to a stirred solution comprising 23.7 grams (0.1 mole) of p-nonylbenzenethiol, 12.6 grams (0.2 mole) of 90% potassium hydroxide and 300 ml. of acetone. The reaction mixture was heated at 50–56° C. for 18 hours, cooled to 25° C. and 300 ml. of ethyl ether and 300 ml. of water added. The solution was stirred for 15 minutes, the ether layer separated, washed with water until neutral to litmus and dried over sodium sulfate. The ether was removed in vacuo at a maximum temperature of 80–90° C./ 1–2 mm. 2-(p-nonylphenylthio)triethylamine was obtained as an amber oil in 89.5% yield. Analysis gave 3.9% nitrogen and 9.93% sulfur compared to 4.2% nitrogen and 9.56% sulfur calculated for $C_{21}H_{37}NS$.

It is intended to cover all changes and modifications of the examples of the invention herein chosen for purposes of disclosure which do not constitute departures from the spirit and scope of the invention.

This application is a continuation-in-part of application Serial No. 810,246, filed May 1, 1959, now abandoned.

What is claimed is:

1. The method of controlling vegetation which comprises applying thereto a phytotoxic amount of a composition containing as the essential active ingredient a compound of the structure

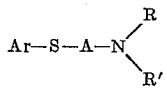

where Ar is a member of the group consisting of phenyl, p-alkylphenyl, xylyl, p-nitrophenyl, p-halophenyl, 3,4-dichlorophenyl, o-benzyl p-chlorophenyl, pentachlorophenyl, and p-lower alkoxyphenyl, A is an alkylene group containing less than five carbon atoms but not more than two when Ar is 3,4-dichlorophenyl, R is selected from the group consisting of lower alkyl, lower alkoxy substituted lower alkyl and lower alkenyl and radicals which with R' and N constitute a heterocyclic radical selected from the group consisting of morpholinyl, piperidinyl and pyrrolidinyl and R' is selected from the group consisting of lower alkyl, lower alkoxy substituted lower alkyl, allyl, methallyl, hydrogen, phenyl, benzyl, propynyl, 2-chloroallyl, 2-bromoallyl, cyclohexyl and radicals which with R and N constitute a heterocyclic radical as defined.

2. The method of controlling vegetation which comprises applying thereto a phytotoxic amount of a composition containing as the essential active ingredient a compound of the structure

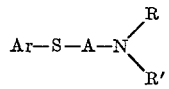

where Ar is the phenyl radical, A is alkylene of 1–3 carbon atoms separating the nitrogen and sulfur by not more than two carbon atoms and R and R' are lower alkyl radicals.

3. The method of controlling vegetation which comprises applying thereto a phytotoxic amount of a composition containing as the essential active ingredient a compound of the structure

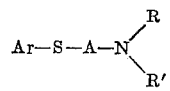

where Ar is para-halogen substituted phenyl, A is alkylene of 1–3 carbon atoms separating the nitrogen and sulfur by not more than two carbon atoms and R and R' are lower alkyl radicals.

4. The method of controlling vegetation which comprises applying thereto a phytotoxic amount of a composition containing as the essential active ingredient a compound of the structure

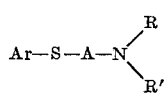

where Ar is p-nitrophenyl, A is alkylene of 1–3 carbon atoms separating the nitrogen and sulfur by not more than two carbon atoms and R and R' are lower alkyl radicals.

5. The method of controlling vegetation which comprises applying thereto a phytotoxic amount of a composition containing as the essential active ingredient a compound of the structure

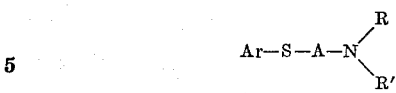

where Ar is p-lower alkoxyphenyl, A is alkylene of 1–3 carbon atoms separating the nitrogen and surfur by not more than two carbon atoms and R and R' are lower alkyl radicals.

6. The method of controlling vegetation which comprises applying thereto a phytotoxic amount of a composition containing as the essential active ingredient 2-(phenylthio)-N,N-dimethylpropylamine.

7. The method of controlling vegetation which comprises applying thereto a phytotoxic amount of a composition containing as the essential active ingredient 2-(phenylthio)-triethylamine.

8. The method of controlling vegetation which comprises applying thereto a phytotoxic amount of a composition containing as the essential active ingredient 2-(p-chlorophenylthio)-N,N-dimethylpropylamine.

9. The method of controlling vegetation which comprises applying thereto a phytotoxic amount of a composition containing as the essential active ingredient 2-(p-chlorophenylthio)triethylamine.

10. The method of controlling vegetation which comprises applying thereto a phytotoxic amount of a composition containing as the essential active ingredient 2-(p-chlorophenylthio)-N,N-dimethylethylamine.

11. The method of controlling vegetation which comprises applying thereto a phytotoxic amount of a composition containing as the essential active ingredient 2-(3,4-dichlorophenylthio)triethylamine.

12. The method of controlling vegetation which comprises applying to the foliage a phytotoxic amount of a composition containing as the essential active ingredient 2-(pentachlorophenylthio)triethylamine.

13. The method of controlling vegetation which comprises applying to the foliage a phytotoxic amount of a composition containing as the essential active ingredient 2-(pentachlorophenylthio)-N,N-dimethylethylamine.

14. The method of controlling vegetation which comprises applying to the foliage a phytotoxic amount of a composition containing as the essential active ingredient 2-(p-methoxyphenylthio)triethylamine.

15. The method of controlling vegetation which comprises applying to the foliage a phytotoxic amount of a composition containing as the essential active ingredient 2-(p-methoxyphenylthio)-N,N-dimethylethylamine.

16. The method of controlling vegetation which comprises applying to the foliage a phytotoxic amount of a composition containing as the essential active ingredient a compound of the structure

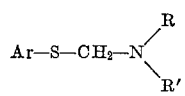

where Ar is p-chlorophenyl and R and R' are lower alkyl radicals.

17. The method of controlling vegetation which comprises applying to the foliage a phytotoxic amount of a composition containing as the essential active ingredient a compound of the structure

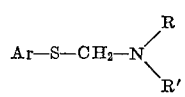

where Ar is p-alkylphenyl and R and R' are lower alkyl radicals.

18. The method of controlling vegetation which comprises applying to the foliage a phytotoxic amount of a composition containing as the essential active ingredient 2-(p-chlorophenylthio)-N,N-diethylmethylamine.

19. The method of controlling vegetation which comprises applying to the foliage a phytotoxic amount of a composition containing as the essential active ingredient 2-(p-chlorophenylthio)-N,N-dibutylmethylamine.

20. The method of controlling vegetation which comprises applying to the foliage a phytotoxic amount of a composition containing as the essential active ingredient 2-(p-nonylphenylthio)triethylamine.

References Cited in the file of this patent

Jones et al. in "Biochemical Journal," vol. 45, 1949, pages 143–149.

Peak et al. in "Chemical Abstracts," vol. 44, 1950, 7797(b).

Schvetz et al.: "J.A.C.S.," vol. 80, pages 162–164, January 1958.